Patented May 3, 1949

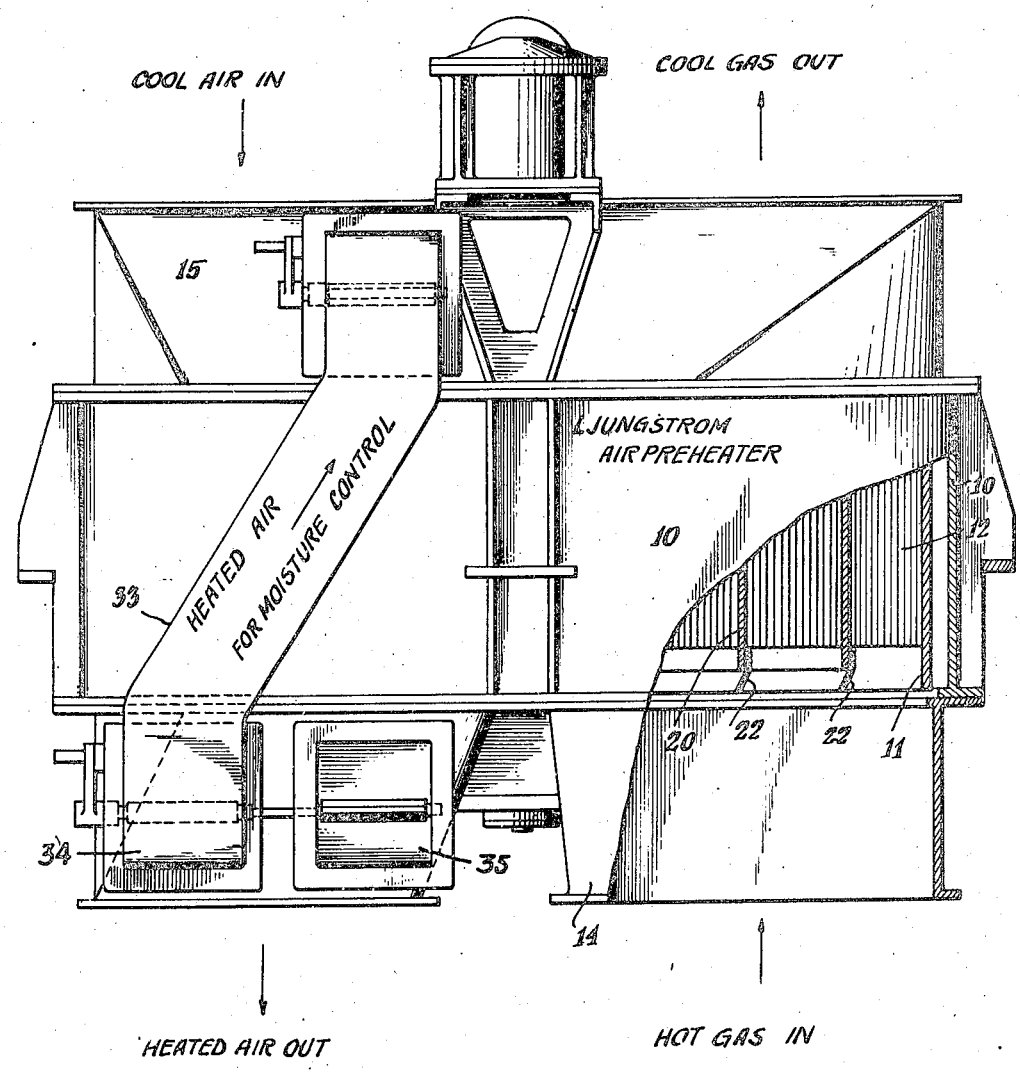

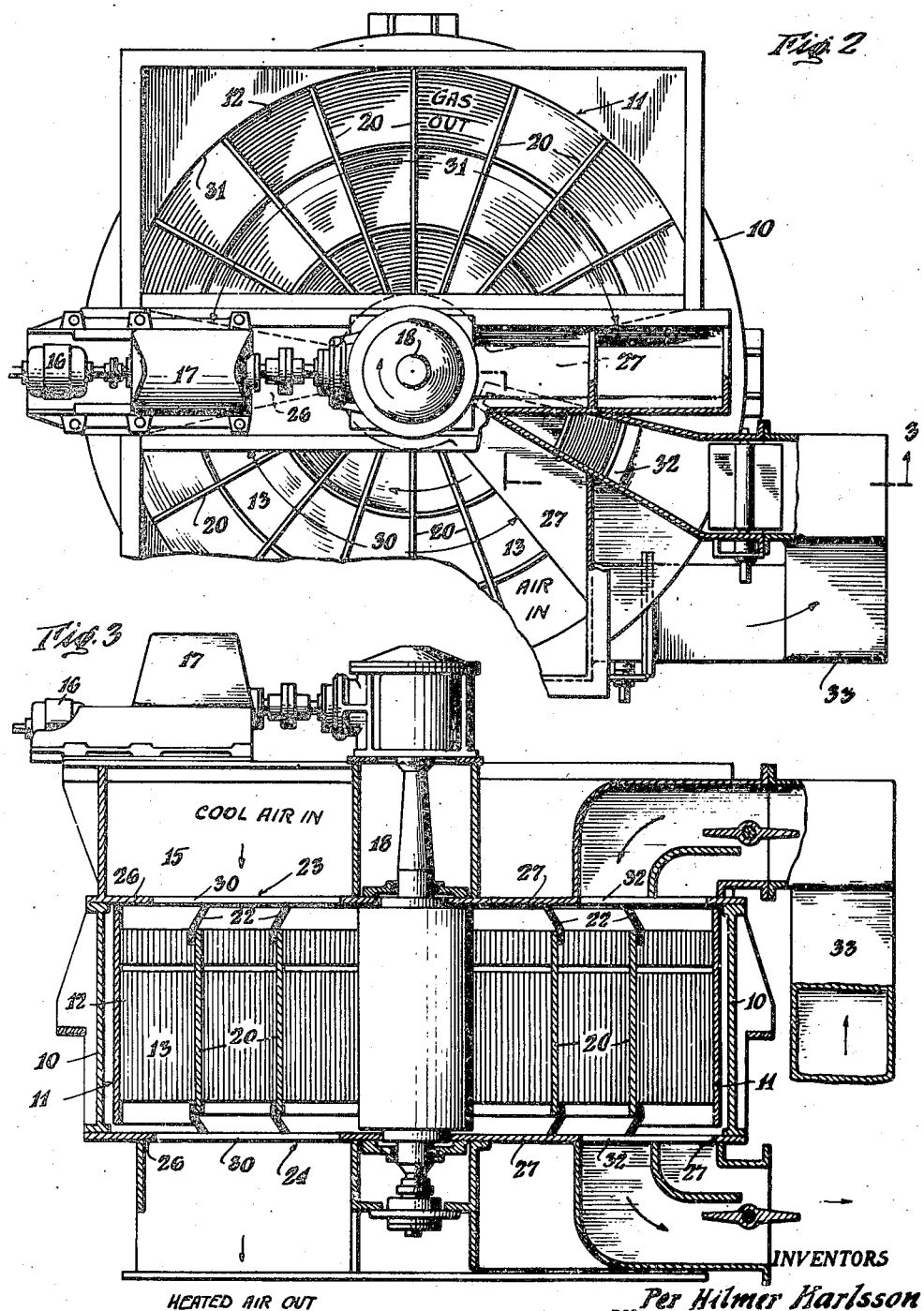

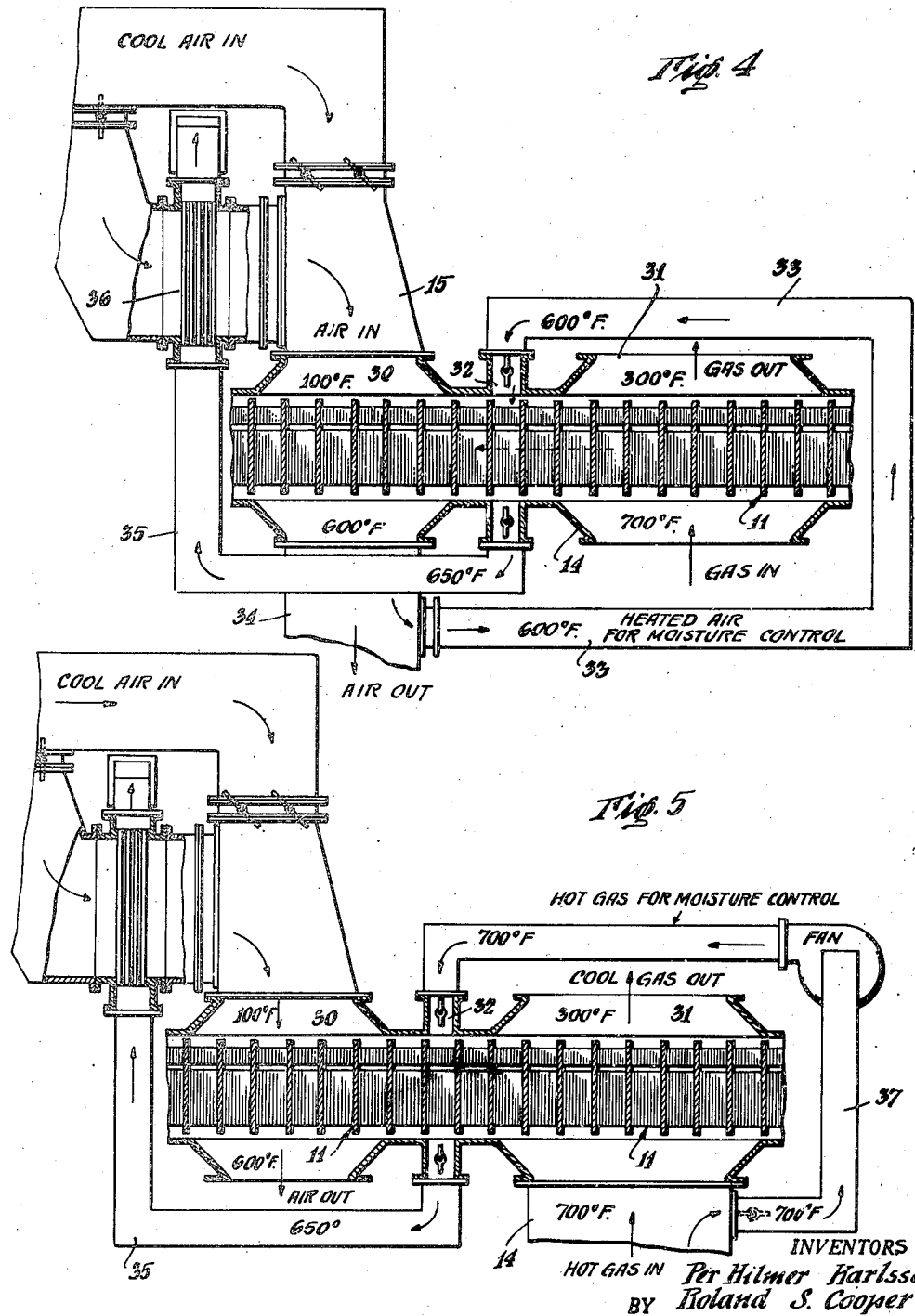

2,468,826

UNITED STATES PATENT OFFICE 2,468,826

MOISTURE CONTROL IN HEAT RECOVERY APPARATUS

Per Hilmer Karlsson, Wellsville, N. Y., and Roland S. Cooper, River Forest, Ill., assignors to The Air Preheater Corporation, New York, N. Y.

Application June 24, 1944, Serial No. 541,907

2 Claims. (Cl. 257—6)

The present invention relates to heat transfer apparatus and particularly to an improved method and apparatus for increasing the heat transfer efficiency of air preheaters or the like utilized to recover heat from hot gases, as combustion gases from a boiler.

Where cold air and hot gases are brought into contact with metallic heat transfer surfaces either successively as in a regenerative preheater, or simultaneously as in a recuperative heat transfer device there is a tendency, particularly at low boiler loads, for moisture to condense from the gases on the heat transfer surfaces at the "cold end" where cold air is admitted and cooled gas is discharged.

In a regenerative air preheater operated at temperatures below the dew point of the gases sweeping over its heat exchange surface, the condensed moisture if left on the surface enables solid particles carried by the gases to smear and adhere to the surface ultimately resulting in a reduction of capacity; in extreme cases the passages for air and gas become completely closed. In recuperative heaters, such condensation and clogging will also result in decreased heat transfer rates. In addition to lowering efficiency such clogging necessitates discontinuing operation of the apparatus to permit cleaning and special devices for accomplishing the latter. These conditions have long been recognized in the art and various ameliorating steps have been adopted such as the recirculation of heated air as in the Ljungstrom Patent 1,649,605, dated November 15, 1927, or hot gas as in Lysholm Patent 1,829,996, dated November 3, 1931, through the air passages to maintain a higher temperature of the surfaces at the cold end of the apparatus.

Notwithstanding this, none of the expedients heretofore adopted have been fully satisfactory because the limit of gas exit temperatures at which an air preheater can operate is dependent, with conventional operating methods, on the dew point of the gases passing over the heating surfaces in such preheater. Where fuels with high sulphur content are burned the furnace with which an air preheater operates the dew point of the gases is high and as a consequence the exit gas temperatures at which an air preheater of either the regenerative or recuperative type can be operated safely is correspondingly high. Where coals containing 3% to 5% sulphur are burned the safe gas exit temperatures permissible are in the neighborhood of 350 to 400 degrees F. From this it may be seen that the necessity of confining the operation of an air preheater to temperature ranges where condensation would be minimized results in an accompanying loss of heat that otherwise might be recovered from the gases of combustion and this consequently involves a lowered operating efficiency.

An object of the invention is to minimize the effects of clogging of the passages of an air preheater.

A second object is to enable heat recovery apparatus to be operated at an increased efficiency by absorbing more heat than has heretofore been possible from the gases without harmful effects.

Our invention contemplates a specially constructed air preheater and a unique method of operating it that permits operation with its surface actually below the dew temperature of the gases passing over the same and results in a large gain in efficiency due to increased heat recovery, especially when burning fuels containing relatively large quantities of sulfur. Our unique method deliberately permits the condensation of moisture on the heat transfer surfaces, which is contrary to all prior practice, in order that the apparatus may be operated at higher efficiency. Our method nevertheless avoids the usual deleterious effects in operating at such low temperatures because the moisture which is first permitted to condense from the gases is then removed before it can cause harm.

While the invention will be described in detail in conjunction with a regenerative heater of the Ljungstrom type such as described in Patent 1,652,025, dated December 6, 1927, it will be understood that the invention is applicable to other types of continuous or intermittent regenerative heat transfer apparatus and also to recuperative or tubular heaters.

In the drawings:

Figure 1 is an elevational view, partly broken away and in section, of a Ljungstrom air preheater embodying the present invention.

Figure 2 is a plan view partly in section of the preheater shown in Figure 1.

Figure 3 is a vertical sectional view on line 3—3 in Figure 2.

Figure 4 is a development-like diagrammatic view of the air preheater showing the relation of gas and air flow through its passages and illustrative operating temperatures.

Figure 5 is a view similar to Figure 4 but showing an arrangement in which hot gases are utilized to absorb moisture from the heat transfer surfaces instead of air as in Figure 4.

As illustrated in the drawings, the air preheater is of the Ljungstrom type having a housing 10 within which a rotor 11 turns to bring regenerative material 12 in its sector-shaped compartments 13 first into contact with gases entering the gas side of the heater through the duct 14 for absorbing heat therefrom and then into contact with air entering through the duct 15 to preheat it, the rotor being turned as by a motor 16 driving its shaft 18 through reduction gearing 17. The sector-shaped compartments 13 are formed as usual by radial partitions or diaphragms 20 and the heat recovery material 12 carried in these compartments is in the form of corrugated metallic heat transfer plates. The partitions 20 carry the usual seals 22 which bear against sector plates 23, 24 opposite the ends of the rotor and act to prevent the cross flow of gas into the air side of the preheater and of air to the gas side. This is because the imperforate portion 26 of each plate that separates the air inlet opening 30 from the gas inlet opening 31 and imperforate portions 27 which separate each of these from a special opening 32 located between them are all wider than the angle subtended by a sector-shaped compartment 13 of the rotor.

It will be noted that in addition to the usual gas and air openings 30, 31, the sector plates are provided with additional openings 32 located between the gas and air openings with the result that a third passage is formed for the flow of fluid through the preheater. This additional passage located between the gas and air sides of the preheater is connected at the "cold end" of the latter to the outlet end of a duct 33 leading from the hot air outlet 34 of the preheater. At the hot end of the preheater the outlet end of this passage may be connected by a duct 35 to the "gas" side of an auxiliary air preheater 36 (Fig. 4) but in any event is discharged to some point where it will not again mix with either the furnace gases or air that pass through the preheater.

The temperature values indicated in Figure 4 are purely illustrative but serve to show that the air preheater functions at a temperature below the dew point of the gases. This is indicated by the fact that the gas outlet temperature is 300 degrees and the air inlet temperature is 100 degrees so that half the sum of the two which is accepted in the art as representing the approximate mean temperature of the plates 12 at the cold end produces a figure of 200 degrees which with fuels of high moisture and sulphur content is obviously below the dew point of the gases derived from the furnace. As a consequence of cooling the plates 12 by the passage of air thereover to a point below the dew point of the gases passing through the gas side, moisture is caused to condense on the plates 12 as they again pass through the gas side of the preheater and are again contacted by gases from which the moisture becomes disentrained. Under ordinary conditions this would not only result in eventual clogging of the passages between the plates 12 but would introduce moisture into the air passing to the furnace, which also is undesirable. However, in accordance with the present invention before the heated plates 12 carrying moisture thereon are returned into the air side of the preheater they must first pass through the passage 32 located between the gas and air passages 30, 31. The connection of the duct 33 to the air outlet 34 of the preheater causes air at a temperature of say 600 degrees F. to pass over the plates and this results in absorbing the moisture from the plates before they are again moved into the air passage 30 of the preheater. Thus it will be seen that although the operating conditions are such as to deliberately allow condensation of moisture on the surfaces, which is ordinarily undesirable, this moisture is removed before the heat transfer surfaces are returned to the air passage. At the same time because the apparatus functions in such a temperature range that the gases passing over the preheater are cooled to below their dew point, an increased amount of heat is recovered from the gases as compared with operating conditions under which it is deemed necessary to maintain the temperatures above the dew point in order to avoid condensation on heat transfer surfaces as has heretofore been practiced.

In Figure 5 hot gas from the inlet 14 is conducted to the "cold end" of passage 32 by a duct 37.

By introducing the preheated air or hot gas for drying or absorption of the moisture condensed on the heating surface at the cold end thereof, maximum absorption of moisture is made possible and recondensation prevented by the fact that in the passages between the openings 32 the carrier air as it passes downward through the just heated surface emerging from the gas passage strikes surface of higher and higher temperatures thus preventing recondensation of the moisture picked up from the surface to be carried away.

At elevated temperatures a small volume of air or gas flowing through passage 32 may pick up and carry off a relatively large amount of moisture. Consequently the provision of a third passage through the preheater need not increase its size greatly since the passage 32 may be quite narrow compared with the gas and air passages 30, 31. Further, this factor also makes use of the system possible without undue increased power consumption in installations where a fan is required in the duct 33 or 37.

By not admixing the moisture laden air or gas from discharge duct 35 with the air stream from the preheater the arrangements shown avoid return of moisture to a boiler furnace and eliminate progressive building up of the moisture content of the heating gases entering the preheater as occurs when either hot air or gas is recirculated for simply raising the temperature of the volume of air entering the preheater.

It is anticipated that with the arrangements and method disclosed it will be possible to operate with gas exit temperatures from the preheater corresponding to a fuel saving of 5 to 6% above that possible with present methods of operation especially where fuels high in sulphur and moisture must be utilized; therefore this method of operation has large economical possibilities.

What we claim is:

1. The method of transferring heat from a hot gas to a cool gas, such as air, through the medium of surfaces heated by the gas to impart heat to the air which comprises; initially passing hot gases in contact with heat exchange surfaces; imparting such an amount of the absorbed heat from said surfaces to air as to lower the temperature of said surfaces to a point below the dew point of the heating gases; passing hot gases over the cooled surfaces to reheat the latter, thereby causing moisture to be deposited on said surfaces from the heating gases; and passing over said surfaces a relatively dry gaseous fluid heated to a temperature sufficiently high to absorb the moisture from said surfaces prior to again imparting heat from said surfaces to cool air.

2. In a regenerative heat exchanger having a housing providing passages therethrough for hot gases and cool air respectively, inlet and outlet ducts connected to the ends of said passages, and means for moving heat exchange material successively through said passages so as to absorb heat from and thereby cool the hot gas and then impart the heat to said air; means forming a third passage in the housing so located between said gas and air passages that said heat exchange material traverses said third passage upon emerging from said gas passage and prior to entering said air passage; a conduit connected to the inlet end of said third passage; means for supplying to said conduit a relatively dry gaseous fluid at a temperature substantially above that of the originally hot but cooled gas upon leaving the outlet of the passage therefor as to evaporate and carry off any moisture condensed upon said heat exchange material from the hot gas prior to contact with the cool air; a duct connected to the outlet end of said third passage for discharging from the system moisture laden gaseous fluid passing through said third passage; an auxiliary air preheater having its gas passage interposed in said conduit; and means connecting the outlet end of the air passage of said auxiliary air preheater to the inlet end of the main air preheater.

PER HILMER KARLSSON.
ROLAND S. COOPER.

REFERENCES CITED

The following references are of record in the file of this patent:

UNITED STATES PATENTS

| Number | Name | Date |
| --- | --- | --- |
| 1,798,370 | Cox | Mar. 31, 1931 |
| 1,829,996 | Lysholm et al. | Nov. 3, 1931 |
| 1,970,127 | Colby et al. | Aug. 14, 1934 |

FOREIGN PATENTS

| Number | Country | Date |
| --- | --- | --- |
| 545,523 | Germany | July 13, 1930 |